(12) United States Patent
Shao et al.

(10) Patent No.: US 12,198,082 B2
(45) Date of Patent: *Jan. 14, 2025

(54) METHOD AND SMART GAS INTERNET OF THINGS SYSTEM FOR MANAGEMENT BASED ON GAS SAFETY

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yongzeng Liang, Chengdu (CN); Xiaojun Wei, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,948

(22) Filed: Jan. 24, 2024

(65) Prior Publication Data

US 2024/0161034 A1 May 16, 2024

Related U.S. Application Data

(63) Continuation of application No. 18/052,195, filed on Nov. 2, 2022, now Pat. No. 11,928,623.

(30) Foreign Application Priority Data

Oct. 14, 2022 (CN) .......................... 202211256360.9

(51) Int. Cl.
*G06Q 10/0631* (2023.01)
*G16Y 10/35* (2020.01)
*G16Y 20/20* (2020.01)

(52) U.S. Cl.
CPC ........ *G06Q 10/06312* (2013.01); *G16Y 10/35* (2020.01); *G16Y 20/20* (2020.01)

(58) Field of Classification Search
CPC .............................................. G06Q 10/06312
See application file for complete search history.

(56) References Cited

U.S. PATENT DOCUMENTS 10,229,394 B1  3/2019  Davis et al.

FOREIGN PATENT DOCUMENTS

| CN | 107809456 A | 3/2018 |
|---|---|---|
| CN | 107835209 A | 3/2018 |

(Continued)

OTHER PUBLICATIONS

Hu, Wenjing, Research and Development of Integrated Intelligent Dynamic Dispatching System for Urban Gas Inspection and Repair, Dissertation Submitted to Zhejiang University of Technology, 2021, 98 pages.

(Continued)

*Primary Examiner* — Nadja N Chong Cruz
(74) *Attorney, Agent, or Firm* — METIS IP LLC

(57) ABSTRACT

A method and a smart gas Internet of Things system for management based on gas safety are provided. The method may comprise obtaining gas-related features of at least one area; determining alert vectors of the at least one area based on the gas-related features by manners for feature extraction; determining a count of on-call maintenance personnel in the at least one area based on the alert vectors; determining whether the count of on-call maintenance personnel meets a preset threshold; and in response to a determination that there is at least one area where the count of on-call maintenance personnel meets the preset threshold, performing, based on an area map, multiple rounds of iterative update on a scheduling capability value of the at least one area that (Continued)

meets the preset threshold; and determining a real-time scheduling policy based on the updated scheduling capability value.

17 Claims, 5 Drawing Sheets

(56) References Cited

FOREIGN PATENT DOCUMENTS

| | | |
|---|---|---|
| CN | 111598323 A | 8/2020 |
| CN | 112799365 A | 5/2021 |
| CN | 114425772 A | 5/2022 |
| CN | 114677043 A | 6/2022 |
| CN | 115050169 A | 9/2022 |

OTHER PUBLICATIONS

First Office Action in Chinese Application No. 202211256360.9 mailed on Dec. 7, 2022, 28 pages.
Decision to grant a patent in Chinese Application No. 202211256360.9 mailed on Mar. 5, 2023, 6 pages.

300

METHOD AND SMART GAS INTERNET OF THINGS SYSTEM FOR MANAGEMENT BASED ON GAS SAFETY

CROSS-REFERENCE TO RELATED APPLICATION

This application is a continuation of U.S. application Ser. No. 18/052,195, filed on Nov. 2, 2022, which claims priority of Chinese Patent Application No. 202211256360.9, filed on Oct. 14, 2022, the contents of each of which are entirely incorporated herein by reference.

TECHNICAL FIELD

The present disclosure relates to the technical field of gas maintenance, in particular to a method and a smart gas Internet of Things system for management based on gas safety.

BACKGROUND

When gas (natural gas) is used by residents in daily life, with the increase of the count of times and the time of use, gas consumption failure may occur. If maintenance is not carried out in time, the normal life of residents may be affected, and sometimes there may be hidden dangers to life safety. When scheduling gas maintenance personnel, gas operating companies often allocate or schedule maintenance personnel based on the gas consumption features of different areas and the operation of gas equipment, which often results in insufficient manpower and the demand to wait for the completion of maintenance in other areas before carrying out maintenance in the next area, greatly reducing the efficiency of gas equipment maintenance. Especially in urban areas with a large population, frequent gas service, and complex gas pipeline network systems, it poses a challenge to how to schedule maintenance personnel efficiently.

Therefore, it is necessary to provide a method for management based on gas safety, for the actual situation of different areas, realize the predictable, reasonable distribution of maintenance personnel.

SUMMARY

One or more embodiments of the present disclosure provide a method for management based on gas safety, wherein the method is implemented by a smart gas Internet of Things system for management based on gas safety, and the smart gas Internet of Things system includes a smart gas user platform, a smart gas service platform, a smart gas safety management platform, a smart gas sensor network platform and a smart gas object platform, and the method is executed by the smart gas safety management platform, the method comprising obtaining gas-related features of at least one area, wherein the gas-related features include gas consumption features; determining alert vectors of the at least one area based on the gas-related features by manners for feature extraction, which include multilayer perceptrons, convolutional neural networks, and residual networks, the alert vectors including a leakage alert value; determining a count of on-call maintenance personnel in the at least one area based on the alert vectors; determining whether the count of on-call maintenance personnel meets a preset threshold; and in response to a determination that there is at least one area where the count of on-call maintenance personnel meets the preset threshold, performing, based on an area map, multiple rounds of iterative update on a scheduling capability value of the at least one area that meets the preset threshold, the area map including one or more nodes and one or more edges, wherein the nodes represent the at least one area; the nodes are connected to form the edges, and each of the edges represents a relationship between two connected nodes; and when an updated scheduling capability value meets a preset condition, the update ends; and determining a real-time scheduling policy based on the updated scheduling capability value. Each round of the multiple rounds of iterative update includes: for each node of the one or more nodes, determining the updated scheduling capability value of the node based on a scheduling capability value to be updated of the node, a scheduling capability value to be updated of each of other nodes directly connected to the node, and a value of an edge between the node and the each of other nodes directly connected to the node; wherein an edge between two of the one or more nodes has a weight, and the weight of the edge is related to household features of the two nodes connected by the edge; and using the updated scheduling capability value of the node as a scheduling capability value to be updated of the node in a next round of iterative update; wherein in a first round of iterative update, the scheduling capability value to be updated of the node is an initial scheduling capability value, the initial scheduling capability value is determined based on a count of on-call maintenance personnel for the node and a count of edges of the other nodes connected to the node.

One or more embodiments of the present disclosure provide a smart gas Internet of Things system for management based on gas safety, the smart gas Internet of Things system includes: a smart gas user platform, a smart gas service platform, a smart gas safety management platform, a smart gas sensor network platform and a smart gas object platform, and the smart gas safety management platform includes a smart gas emergency maintenance management sub-platform and a smart gas data center. The smart gas data center is configured to obtain gas-related features of at least one area from the smart gas object platform based on the smart sensor network platform, and the gas-related features including gas consumption features, wherein, the smart gas object platform is configured as a gas safety monitoring device installed in the at least one area. The smart gas emergency maintenance management sub-platform is configured to determine alert vectors of the at least one area based on the gas-related features by manners for feature extraction, which include multilayer perceptrons, convolutional neural networks, and residual networks, the alert vectors include a leakage alert value; determine a count of on-call maintenance personnel in the at least one area based on the alert vectors; determine whether the count of on-call maintenance personnel meets a preset threshold; and in response to a determination that there is at least one area where the count of on-call maintenance personnel meets the preset threshold, perform, based on an area map, multiple rounds of iterative update on a scheduling capability value of the at least one area that meets the preset threshold, the area map including one or more nodes and one or more edges, wherein the nodes represent the at least one area; the nodes are connected to form the edges, and each of the edges represents a relationship between two connected nodes; and when an updated scheduling capability value meets a preset condition, the update ends; determine a real-time scheduling policy based on the updated scheduling capability value, and send the scheduling policy to the smart gas data center. The smart gas data center is configured to send the scheduling policy to the smart gas user platform through the smart gas service platform. Each round of the multiple rounds of iterative update includes: for each node of the one or more nodes, determining the updated scheduling capability value of the node based on a scheduling capability value to be updated of the node, a scheduling capability value to be updated of each of other nodes directly connected to the node, and a value of an edge between the node and the each of other nodes directly connected to the node; wherein an edge between two of the one or more nodes has a weight, and the weight of the edge is related to household features of the two nodes connected by the edge; and using the updated scheduling capability value of the node as a scheduling capability value to be updated of the node in a next round of iterative update; wherein in a first round of iterative update, the scheduling capability value to be updated of the node is an initial scheduling capability value, the initial scheduling capability value is determined based on a count of on-call maintenance personnel for the node and a count of edges of the other nodes connected to the node.

One or more embodiments of the present disclosure provide a non-transitory computer-readable storage medium storing a set of instructions, when executed by at least one processor, causing the at least one processor to perform the method for management based on gas safety.

BRIEF DESCRIPTION OF THE DRAWINGS

The present disclosure may be further explained by way of exemplary embodiments, which may be described in detail by means of the accompanying drawings. These examples are not limiting, in these examples, the same numbers refer to the same structures, wherein.

DETAILED DESCRIPTION

Figure 1:
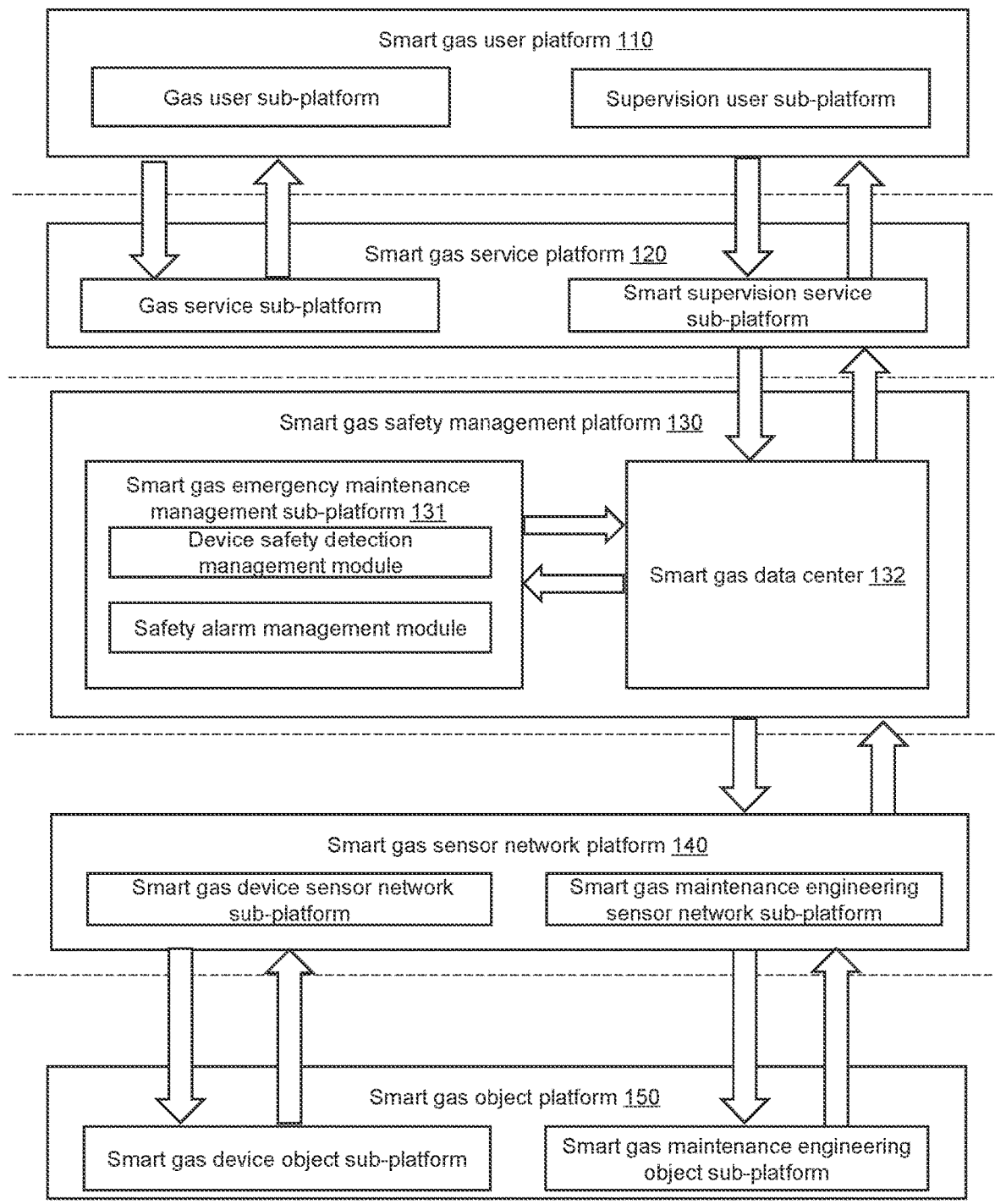
FIG. 1 is an exemplary schematic diagram illustrating a smart gas Internet of Things system for maintenance scheduling and management based on gas safety according to some embodiments of the present disclosure.

In order to more clearly illustrate the technical solutions of the embodiments of the present disclosure, the following will briefly introduce the drawings that demand to be used in the description of the embodiments. Obviously, the drawings in the following description are only some examples or embodiments of the disclosure. For those of ordinary skill in the art, without creative work, the disclosure can be applied to other similar scenarios according to these drawings. Unless it is obvious from the language environment or otherwise stated, the same reference numbers in the drawings represent the same structure or operation.

It should be understood that the "system", "device", "unit" and/or "module" used herein is a method for distinguishing different components, elements, parts, portions, or assemblies of different levels. However, if other words can achieve the same purpose, the words can be replaced by other expressions.

As shown in the present disclosure and the claims, unless the context clearly suggests exceptional circumstances, the words "a", "an", and/or "the" do not only specifically refer to the singular form, but also include the plural form; the plural form may be intended to include the singular form as well. Generally speaking, the terms "including," "includes," "include," "comprise," "comprises," and "comprising," only suggest that the operations and/or elements that have been clearly identified are included, but these operations and/or elements do not constitute an exclusive list, and the method, system, or device may also include other operations or elements.

Flowcharts are used in the present disclosure to describe operations performed by a system according to an embodiment of the present disclosure. It should be understood that the preceding or following operations are not necessarily performed in the exact order. Instead, the various operations may be processed in reverse order or simultaneously. Also, other operations may be added to these procedures, or an operation or operations may be removed from these procedures.

FIG. 1 is an exemplary schematic diagram illustrating a smart gas Internet of Things system for maintenance scheduling and management based on gas safety according to some embodiments of the present disclosure.

An Internet of Things system is an information processing system that includes part or all of a user platform, a service platform, a management platform, a sensor network platform, and an object platform. A user platform is a functional platform that realizes user perception information acquisition and control information generation. A service platform may realize the connection of the management platform and the user platform, and plays the functions of perception information service communication and control information service communication. A management platform may realize the overall planning and coordination of the connection and cooperation between various functional platforms (such as the user platform and the service platform). A management platform gathers the information of the Internet of Things operation system and may provide perception management and control management functions for the Internet of Things operation system. A sensor network platform is a functional platform for managing sensor communication. In some embodiments, the sensor network platform may connect the management platform and the object platform to realize the functions of perception sensing communication and control information sensing communication. An object platform is a functional platform for perception information generation.

The processing of information in the Internet of Things system may be divided into a processing flow of user perception information and a processing flow of control information. The control information may be information generated based on user perception information. In some embodiments, the control information may include user demand control information, and the user perception information may include user query information. Among them, the processing of perception information includes the object platform obtaining the perception information and transmitting the perception information to the management platform through the sensor network platform. The user demand control information may be transmitted from the management platform to the user platform through the service platform, thereby realizing the control of the sending of prompt information.

In some embodiments, when the Internet of Things system is applied to gas management, it may be called a smart gas Internet of Things system.

In some embodiments, as shown in FIG. 1, the smart gas Internet of Things system 100 for maintenance scheduling and management based on gas safety may include a smart gas user platform 110, a smart gas service platform 120, a smart gas safety management platform 130, a smart gas sensor network platform 140, and a smart gas object platform 150.

The smart gas user platform 110 may be a platform for interacting with users. Users may be gas users, supervision users, etc. For example, the gas users may be ordinary gas users, commercial gas users, industrial gas users, or the like. The supervision user may be a person in charge of a supervisory part of gas safety, or the like. In some embodiments, the smart gas user platform 110 may be configured as a terminal device. For example, the terminal device may include a mobile device, a tablet computer, etc., or any combination thereof. In some embodiments, the smart gas user platform 110 may be configured to receive information and/or instructions. For example, the smart gas user platform 110 may obtain the relevant information (e.g., a maintenance policy, a maintenance time, and a maintenance item) of the scheduling policy generated by the smart gas safety management platform 130 of the maintenance personnel through the terminal device. For another example, the smart gas user platform 110 may obtain an instruction from the gas user to inquire about the gas bill through the terminal device. In some embodiments, the smart gas user platform 110 may feed back information to the user through the terminal device. For example, the smart gas user platform 110 may display the scheduling information (e.g., maintenance personnel information, quantity, and maintenance progress, etc.) of the emergency maintenance project to the gas user through the terminal device (e.g., a display). In some embodiments, the smart gas user platform 110 may send the request and/or instruction input by the user to the smart gas service platform 120 and obtain corresponding information fed back by the smart gas service platform 120.

In some embodiments, the smart gas user platform 110 may include a gas user sub-platform and a supervision user sub-platform. The gas user sub-platform corresponds to the gas service sub-platform. For example, the gas user sub-platform may obtain the gas consumption, cost and other information of the gas user from the gas service sub-platform, and feed them back to the user. For another example, the gas user sub-platform may send gas user prompt information, alarm information, etc. to the gas user through the terminal device. The supervision user sub-platform corresponds to the smart supervision service sub-platform. In some embodiments, the supervision user may supervise and manage the safe operation of the entire Internet of Things system through the supervision user sub-platform, so as to ensure the safe and orderly operation of the smart gas Internet of Things system 100 for maintenance scheduling and management based on gas safety.

The smart gas service platform 120 may be a platform for conveying the user's demand and control information, which connects the smart gas user platform 110 and the smart gas safety management platform 130. The smart gas service platform 120 may obtain data from the smart gas safety management platform 130 (e.g., a smart gas data center 132), and send the data to the smart gas user platform 110. In some embodiments, the smart gas service platform 120 may include processing device as well as other components. The processing device may be a server or a server group.

In some embodiments, the smart gas service platform 120 may include a gas service sub-platform and a smart supervision service sub-platform. The gas service sub-platform may be a platform that provides gas users with gas service, which corresponds to the gas user sub-platform. For example, the gas service sub-platform may send information such as a gas bill, a gas safety guideline, and an abnormal gas consumption reminder of the gas user to the gas user sub-platform, and then feed back to the gas user. The smart supervision service sub-platform may be a platform that provides supervision demands for a supervision user, which corresponds to the supervision user sub-platform. For example, the smart supervision service sub-platform may send the safety management information of gas device, the scheduling information of maintenance projects, etc. to the supervision user sub-platform, and the supervision user may review, supervise and guide.

The smart gas safety management platform 130 may refer to a platform that coordinates and coordinates the connection and collaboration between various functional platforms, gathers all the information of the Internet of Things, and provides perception management and control management functions for the Internet of Things operation system. In some embodiments, the smart gas safety management platform 130 may include processing devices and other components. The processing device may be a server or a server group. In some embodiments, the smart gas safety management platform 130 may be a remote platform controlled by a user, artificial intelligence, or preset rules.

In some embodiments, the smart gas safety management platform 130 may include a smart gas emergency maintenance management sub-platform and a smart gas data center.

The smart gas emergency maintenance management sub-platform may be a platform for analyzing and processing data. In some embodiments, the smart gas emergency maintenance management sub-platform may perform two-way interaction with the smart gas data center. For example, the smart gas emergency maintenance management sub-platform may obtain safety management-related data (e.g., gas device abnormality information, maintenance project information) from the smart gas data center for analysis and processing, and send the processing results to the smart gas data center.

In some embodiments, the smart gas emergency maintenance management sub-platform 131 may include a device safety detection management module and a safety alarm management module. The device safety detection management module may be configured to process historical safety data and current operation safety data of device in the smart gas object platform. The safety alarm management module may be configured to process the safety alarm information uploaded by the smart gas object platform. In some embodiments, the smart gas emergency maintenance management sub-platform 131 may further include a work order schedule management module and a material management module. The work order schedule management module may be configured to schedule personnel arrangements according to the demands of emergency maintenance tasks when gas maintenance engineers are required for on-site emergency maintenance, and may process information about the progress of task execution. The material management module may process the information of the material receiving personnel, category, quantity and material cost of the corresponding work order. It should be noted that the above management modules are not intended to limit the management modules included in the smart gas emergency maintenance management sub-platform 131.

The smart gas data center 132 may be configured to store and manage all operation information of the smart gas Internet of Things system 100 for maintenance scheduling and management based on gas safety. In some embodiments, the smart gas data center 132 may be configured as a storage device (e.g., a database) for storing historical, current gas safety data. For example, the smart gas data center 132 may store the safety information of the gas pipeline, the arrangement records of the maintenance personnel, and the emergency repair progress of the maintenance personnel, etc.

In some embodiments, the smart gas safety management platform 130 may exchange information with the smart gas service platform 120 and the smart gas sensor network platform 140 through the smart gas data center 132, respectively. For example, the smart gas data center 132 may send the relevant information (e.g., a count of maintenance personnel, a maintenance policy, a maintenance time, and a maintenance item, etc.) of the maintenance personnel's scheduling policy to the smart gas service platform 120 (e.g., a gas service sub-platform), and may also receive the query instruction of the relevant information of the maintenance personnel's scheduling policy issued by the smart gas service platform 120. For another example, the smart gas data center may send an instruction to obtain the operation information of the gas device to the smart gas sensor network platform 140 (e.g., a smart gas device sensor network sub-platform), and receive the operation information of the gas device uploaded by the smart gas sensor network platform.

The smart gas sensor network platform 140 may be a functional platform for managing sensor communication. In some embodiments, the smart gas sensor network platform 140 may be connected with the smart gas safety management platform 130 and the smart gas object platform 150 to realize the functions of perception information sensing communication and control information sensing communication.

In some embodiments, the smart gas sensor network platform 140 may include a smart gas device sensor network sub-platform and a smart gas maintenance engineering sensor network sub-platform. The smart gas device sensor network sub-platform may send the operation information of the gas device (e.g., the abnormal operation information of the gas device) uploaded by the smart gas device object sub-platform to the smart gas data center 132. The smart gas maintenance engineering sensor network sub-platform may send maintenance engineering related information (e.g., the maintenance progress) uploaded by the smart gas maintenance engineering object sub-platform to the smart gas data center 132.

The smart gas object platform 150 may be a functional platform for perception information generation. For example, the smart gas object platform 150 may generate the safety operation information of the gas pipeline network (e.g., an abnormal information of gas pipeline, an emergency maintenance information of maintenance engineering, etc.), and upload the safety operation information to the smart gas data center through the smart gas sensor network platform 140.

In some embodiments, the smart gas object platform 150 may include a smart gas device object sub-platform and a smart gas maintenance engineering object sub-platform. In some embodiments, the smart gas device object sub-platform may be configured as various types of gas devices (e.g., gas pipeline network device) and monitoring device, and may be configured to obtain operation information of the gas device. For example, the smart gas device object sub-platform may obtain real-time gas flow, pressure, temperature and other indicators of the gas pipeline network device through a gas flow meter, a pressure sensor, a temperature sensor, etc., and send them to the smart gas data center 132 through the smart gas device sensor network sub-platform. In some embodiments, the smart gas maintenance engineering object sub-platform may include various maintenance devices, maintenance workers, or the like. For example, the smart gas maintenance engineering object sub-platform may include a maintenance vehicle, a maintenance appliance, an alarm device, or the like. The smart gas maintenance engineering object sub-platform may upload the execution status of the maintenance engineering (e.g., the maintenance progress) to the smart gas data center 132 through the smart gas maintenance engineering sensor network sub-platform. In some embodiments, after the smart gas safety management platform 130 generates the maintenance policy for the maintenance personnel and the corresponding instructions, the smart gas maintenance engineering object sub-platform may receive the instructions through the smart gas sensor network platform 140 to prompt the maintenance personnel to carry out or ongoing related operations.

Some embodiments of the present disclosure may form a closed loop of smart gas emergency maintenance management information operation among gas devices, maintenance engineering personnel, gas supervision users, and gas users to realize informatization and wisdom of emergency maintenance management and ensure effective management based on the smart gas Internet of Things system 100 for maintenance scheduling and management based on gas safety.

It should be noted that the smart gas Internet of Things system 100 for maintenance scheduling and management based on gas safety is provided for illustrative purposes only, and is not intended to limit the scope of the present disclosure. For those skilled in the art, various modifications or changes can be made based on the description of the present disclosure. For example, the smart gas Internet of Things system 100 for maintenance scheduling and management based on gas safety may include one or more other suitable components to achieve similar or different functions. However, changes and modifications do not depart from the scope of the present disclosure.

Figure 2:
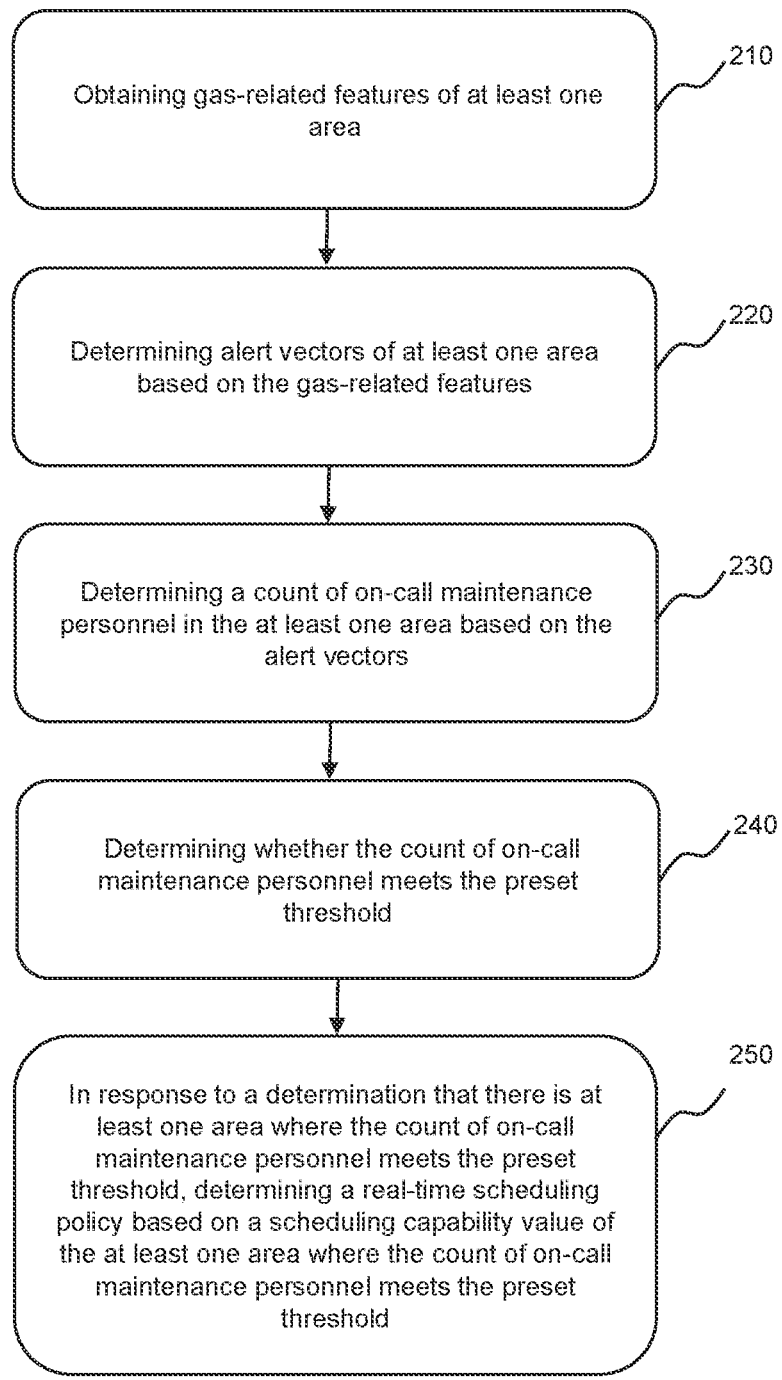
FIG. 2 is an exemplary flowchart illustrating a method for maintenance scheduling and management based on gas safety according to some embodiments of the present disclosure.

FIG. 2 is an exemplary flowchart illustrating a method for maintenance scheduling and management based on gas safety according to some embodiments of the present disclosure. As shown in FIG. 2, the process 200 may include the following operations. In some embodiments, the process 200 may be performed by the smart gas safety management platform 130.

In operation 210, obtaining gas-related features of at least one area.

The gas-related features may be features related to the gas delivery in the area where the user is located, and may be configured to reflect the risk degree of gas leakage. For example, the gas-related features may be the user's gas demand, the actual gas delivery volume, or the arrangement of the delivery and distribution pipelines. In some embodiments, the gas-related features may include gas consumption features.

The gas consumption features may refer to the features that can reflect the user's gas consumption condition in a certain area. In some embodiments, the gas consumption features may include the normal supplies of gas within a certain period of time, for example, the gas consumption of the user, or the like. The gas consumption of the user may be an average value, for example, the gas consumption of the user may be statistical values such as the weekly average gas consumption and the monthly average gas consumption of the users in a certain area. The greater the gas consumption, the higher the severity of casualties that may be caused by gas leakage. In some embodiments, the gas consumption features may include the total counts of gas consumption failures in a certain area.

In some embodiments, the gas consumption features may include the count of gas consumption failures. The gas consumption failures may reflect the safety of gas facilities in the area where the user is located. For example, the higher the count of gas consumption failures, the higher the risk of gas leakages in the area.

The gas consumption failure may refer to the situation in which abnormal gas supply causes users to be unable to use gas normally. For example, the gas consumption failure may be gas leakage in the gas pipeline, gas meter failure, gas outage, etc.

In some embodiments, the gas-related features may also include household features, which are configured to reflect the severity of casualties that may be caused by gas leakage.

The household features may refer to features reflecting household information in a certain area. The household information may be household size information, household distribution information, or household's personnel type information. For example, the household features may be that area A is mostly elderly, area B is densely populated, or area C has 80 households, etc. For another example, the household features may include the distribution of or the count of industrial gas users, commercial gas users, and ordinary natural gas users in each area. The higher the population density in the area where the households are located, the higher the severity of casualties that may be caused by gas leakage. In some embodiments, the household features may also include whether the residence is an elevator room or an operation room, the degree of ventilation of the residence, or the like. A poor ventilation or taking an elevator during a gas leakage may cause an explosion, so more serious casualties may occur in areas with poor ventilation and the elevator.

In some embodiments, the gas-related features may also include gas facility features.

The gas facility features may refer to the features that can reflect the situation of the hardware facilities for gas transmission. For example, a gas facility feature may be a cooktop, a connection tightness of a valve, or the like.

In some embodiments, the gas facility features may include a type of a gas meter and a wear degree of a wiring.

Usually, a gas meter needs to be configured to calculate the gas consumption. Different gas meters have different maximum rated flow rates. For example, general residential users may set up a 1.6-type gas meter according to their demands, and maximum rated flow of the gas meter is 2.5 $m^3/h$. Users with additional heating device and large living area (a villa area) may choose high-type gas meters, such as 2.5-type, 4-type, 6-type, etc. In some embodiments, the gas-related features may be determined based on the type of gas meter. For example, if the household gas meters in area A are all 4-type gas meters, the corresponding gas-related feature in this area is that the demand for gas is large.

In some embodiments, the type of gas meter may reflect the severity of the gas leakage hazard. For example, older models of gas meters are more prone to failure than newer models, so gas leakages are less noticeable to users.

In some embodiments, the wear degree of the wiring is related to the use years of wiring. The longer the use years, the higher the wear degree of the wiring and the higher the risk of gas leakage.

In some embodiments, the wear degree of the wiring is related to a pressure during the gas delivery. The higher the pressure during gas delivery, the more serious the wiring wear may be. The pressure data during gas delivery may be read from the metering device of the gas wiring. In some embodiments, a table corresponding to the wear degree of the wiring and the pressure during the gas delivery may be manually set. For example, the wear degree of the wiring corresponding to the high-pressure delivery when the pressure during the gas delivery exceeds the threshold value may be to the third-level wear, and the wear degree of the wiring corresponding to the low-pressure delivery when the pressure during the gas delivery is lower than the threshold value may be set to the first-level wear, then the wear degree of the wiring may be determined based on the correspondence in the correspondence table.

In operation 220, determining alert vectors of at least one area based on the gas-related features.

The alert vectors may reflect the probability that the user needs gas maintenance. For example, the alert vectors may be a plurality of alert values that reflect the degree of maintenance warning, and the higher the alert value, the higher the probability that gas maintenance is required.

In some embodiments, feature extraction may be performed on gas-related features to obtain corresponding alert vectors. Methods for feature extraction may include, but are not limited to, multilayer perceptrons, convolutional neural networks, residual networks, or the like.

In some embodiments, the alert vectors may include a leakage alert value.

The leakage alert value may be configured to reflect the probability of gas leakage, and the higher the leakage alert value, the higher the possibility of gas leakage.

In some embodiments, the alert vectors may also include an overhaul alert value, a maintenance alert value, or the like. The overhaul alert value may be configured to reflect the probability that the wiring needs to be checked for safety, and the maintenance alert value may be configured to reflect the probability that the wiring needs to be repaired.

In operation 230, determining a count of on-call maintenance personnel in the at least one area based on the alert vectors.

The on-call maintenance personnel may refer to maintenance personnel who are in an idle state and may be deployed.

In some embodiments, the smart gas emergency maintenance management sub-platform may determine the alert vectors of each area based on the gas-related features, and the alert vectors may include a leakage alert value. The smart gas emergency maintenance management sub-platform may further determine the allocation of on-call maintenance personnel in each area according to a proportion of the leakage alert value of each area to leakage alert values of all areas. For example, the leakage alert values of areas A, B, C, and D are 0.9, 0.3, 0.2, and 0.2, respectively, and the total counts of on-call maintenance personnel is 32, and if the count of on-call maintenance personnel left in areas A, B, C and D is the same and their distance to the on-call maintenance personnel's area to be scheduled is the same, the on-call maintenance personnel that may be allocated to area A is 32 (persons)×0.9/(0.9+0.3+0.2+0.2)=18 (persons), the on-call maintenance personnel allocated to area B is 32 (persons)×0.3/(0.9+0.3+0.2+0.2)=6 (persons), and the on-call maintenance personnel allocated to areas C and D are 32 (persons)×0.3/(0.9+0.3+0.2+0.2)=6 (persons), and the on-call maintenance personnel allocated to areas C and D are 32 (people)×0.2/(0.9+0.3+0.2+0.2)=4 (people), respectively More descriptions of the leakage alert value, reference may be found in FIG. 3 and its related descriptions.

In operation 240, determining whether the count of on-call maintenance personnel meets the preset threshold. In response to a determination that there is at least one area where the count of on-call maintenance personnel meets the preset threshold, the operation 250 may be performed.

The preset threshold may refer to the count of on-call maintenance personnel when the count of on-call maintenance personnel in the area does not meet the maintenance requirements. For example, the preset threshold may be 0.

In some embodiments, the smart gas emergency maintenance management sub-platform may be configured to determine the count of on-call maintenance personnel, the area to be maintained, and the scheduling of the maintenance personnel.

In operation 250, in response to a determination that there is at least one area where the count of on-call maintenance personnel meets the preset threshold, determining a real-time scheduling policy based on a scheduling capability value of the at least one area where the count of on-call maintenance personnel meets the preset threshold.

The scheduling capability value may reflect the ability to schedule maintenance personnel to other areas. The larger the scheduling capability value, the greater the supply-demand ratio of maintenance personnel in the area, and the more capable of scheduling maintenance personnel to areas with insufficient maintenance personnel.

The scheduling policy may include the scheduling quantity and scheduling location when scheduling the on-call maintenance personnel. For example, 2 on-call maintenance personnel are scheduled from area A to area B.

In some embodiments, a real-time scheduling policy may be determined based on a scheduling capability value of at least one area that meet a preset threshold. More descriptions of determining the scheduling policy may be found in FIG. 4 and FIG. 5.

Some embodiments of the present disclosure determine the count of on-call maintenance personnel in different areas based on the alert values of gas leakage in different areas, which may make the scheduling of maintenance personnel more reasonable. When the count of on-call maintenance personnel in an area is insufficient, personnel may be temporarily drawn from other areas based on the scheduling capacity value, which may meet the maintenance needs of users in a timely manner.

Figure 3:
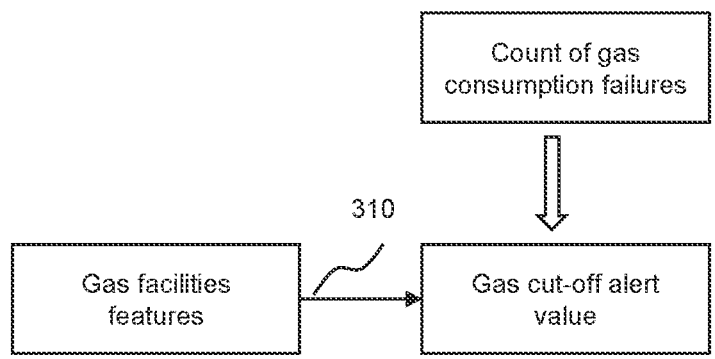
FIG. 3 is an exemplary flow chart illustrating determining a gas cut-off alert value according to some embodiments of the present disclosure.

FIG. 3 is an exemplary flow chart illustrating determining a gas cut-off alert value according to some embodiments of the present disclosure.

In some embodiments, the alert vectors may also include a gas cut-off alert value. As shown in FIG. 3, in some embodiments, determining alert vectors of the at least one area based on gas-related features may include operation 310: determining a gas cut-off alert value of the at least one area based on gas facility features. For example, the older the gas meter and the more wear and tear on the wiring, the higher the gas cut-off alert value. In some embodiments, if the wiring reflected by the alert vector corresponding to the gas facility feature is relatively old, the gas cut-off alert value may be determined to be 0.8; if the user's gas meter is relatively new, the gas-cut alert value may be determined to be 0.1.

The gas cut-off alert value may be configured to reflect the probability of gas cut-off, and the higher the gas cut-off alert value, the higher the possibility of gas cut-off.

In some embodiments, the gas cut-off alert value is related to the count of gas consumption failures, and the higher the count of gas consumption failures, the higher the gas cut-off alert value. For example, when the count of gas consumption failures per month is between 0-10 times, the gas cut-off alert value may be set to 0.1, when the count of gas consumption failures per month is between 10-30 times, the gas cut-off alert value may be set to 0.3, and when the count of gas consumption failures per month is between 30-60 times, the gas cut-off alert value may be set to 0.6.

It should be noted that the above-mentioned descriptions of the related processes are only for example and illustration, and do not limit the scope of application of the present disclosure. For those skilled in the art, various modifications and changes can be made to the procedures under the guidance of the present disclosure. However, these corrections and changes are still within the scope of the present disclosure.

Figure 4:
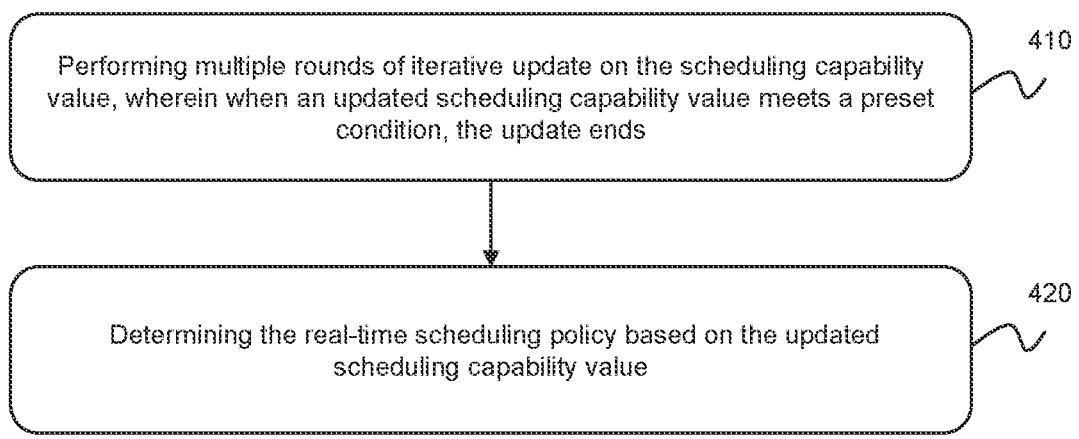
FIG. 4 is a flow chart illustrating determining a real-time scheduling policy based on a scheduling capability value according to some embodiments of the present disclosure.

FIG. 4 is a flow chart illustrating determining a real-time scheduling policy based on a scheduling capability value according to some embodiments of the present disclosure.

In some embodiments, the process 400 may be performed by the smart gas safety management platform 130. As shown in FIG. 4, the process 400 may include the following operations:

In operation 410, performing multiple rounds of iterative update on the scheduling capability value, wherein when an updated scheduling capability value meets a preset condition, the update ends.

The iterative update may refer to the process of updating the scheduling capability value of each area in the current round based on the scheduling capability value of each area in the previous round, thereby obtaining the final scheduling capability value of each area. For example, the smart gas safety management platform 130 may perform multiple rounds of deduction and calculation through modeling or various analysis methods based on information such as gas-related features of each area and the count of on-call maintenance personnel to update the scheduling capability value of each area.

The preset condition may be a condition for ending the iterative update that is preset based on various rules. For example, the preset condition may be that the count of iterations reaches a preset threshold of the count of iterations (e.g., 100 times). For another example, the preset condition may be that the absolute value of the difference between the sums of the scheduling capability values of all areas in two adjacent rounds of iterations is smaller than a preset difference threshold. Exemplarily, after the 40th round of iterative update, the sum of the scheduling capability values of all area is 51.5, and after the 41st round of iterative update, the sum of the scheduling capability values of all areas is 51.6, and the absolute value of the difference between the two is |51.6−51.5|=0.1. If the preset difference threshold is 0.2, the update ends.

In some embodiments, the smart gas safety management platform 130 may perform multiple rounds of iterative updates on the scheduling capability value of each area based on a preset algorithm. More Descriptions may be found in FIG. 5 and its related descriptions.

In operation 420, determining the real-time scheduling policy based on the updated scheduling capability value.

In some embodiments, the smart gas safety management platform 130 may determine the real-time scheduling policy according to a preset rule based on the updated scheduling capability value of each area.

For example, the smart gas safety management platform 130 may determine the count of personnel to be scheduled based on the proportional relationship of the scheduling capability values of the areas. Exemplarily, for areas A, B, C, D, and E, the count of on-call maintenance personnel in area C may be 0, and 10 gas maintenance personnel may be required. If the scheduling capability values of areas A, B, D, and E are 1, 2, 1, and 1, respectively, the proportional relationship of the corresponding scheduling personnel is 1:2:1:1, the count of maintenance personnel allocated from area B to area C is 10*1/5=2, and the count of maintenance personnel allocated from area B to area C is 10*2/5=4 based on the proportional relationship. By analogy, the count of maintenance personnel allocated from areas D and E is 2 and 2 respectively.

For example, for areas that need maintenance personnel, the smart gas safety management platform 130 can sort the areas based on their scheduling capability values from largest to smallest, and first draw maintenance personnel from the area with the largest scheduling capability value, and when the number of personnel in the target area does not meet the demand, then draw personnel from the remaining areas in order of scheduling capability values from largest to smallest, until the target area meets the demand for maintenance personnel.

The smart gas safety management platform 130 may determine the real-time scheduling policy in various feasible ways based on the scheduling capability value of each area. The real-time scheduling policy may be determined by other ways.

In some embodiments, the smart gas safety management platform 130 may also determine the real-time scheduling policy based on the scheduling cost of at least one area.

The scheduling cost may refer to the cost generated by scheduling maintenance personnel based on the scheduling policy. For example, the time cost, transportation cost for maintenance personnel to travel back and forth, etc. Exemplarily, when the distance between the two areas is long, the time required for the maintenance personnel to schedule between the two areas is longer, which affects the timeliness of scheduling of the maintenance personnel.

In some embodiments, the smart gas safety management platform 130 may determine the scheduling cost based on historical data. For example, the smart gas safety management platform 130 (e.g., the smart gas emergency maintenance management sub-platform 131) may obtain historical personnel scheduling records between areas from the smart gas data center 132 and obtain the corresponding scheduling costs.

The smart gas safety management platform 130 may also determine the scheduling cost based on prior knowledge. For example, a prior table of the scheduling cost may be determined according to the geographical location, area size, scheduling distance, etc. of each area. When determining the real-time scheduling policy, based on the positional relationship between the target area and other areas, the scheduling cost may be determined by querying the prior table, and then the real-time scheduling policy may be determined. For example, maintenance personnel are scheduled from areas where the scheduling cost is lower than a preset cost threshold.

In some embodiments, the smart gas safety management platform 130 may construct an area map based on each area of the city, the area map may include nodes and edges, and the scheduling cost may include an edge feature. Among them, the edge feature may include the distance between areas. More descriptions of the area map may be found in FIG. 5 and its related descriptions.

Some embodiments of the present disclosure obtain the scheduling capability values of each region through multiple rounds of iterative updates, and determine the real-time scheduling policy through the scheduling capability values of each area, which helps the scheduling policy to more fully and accurately consider the interconnection between the areas. At the same time, the introduction of the scheduling cost also makes the scheduling policy more practical.

Figure 5:
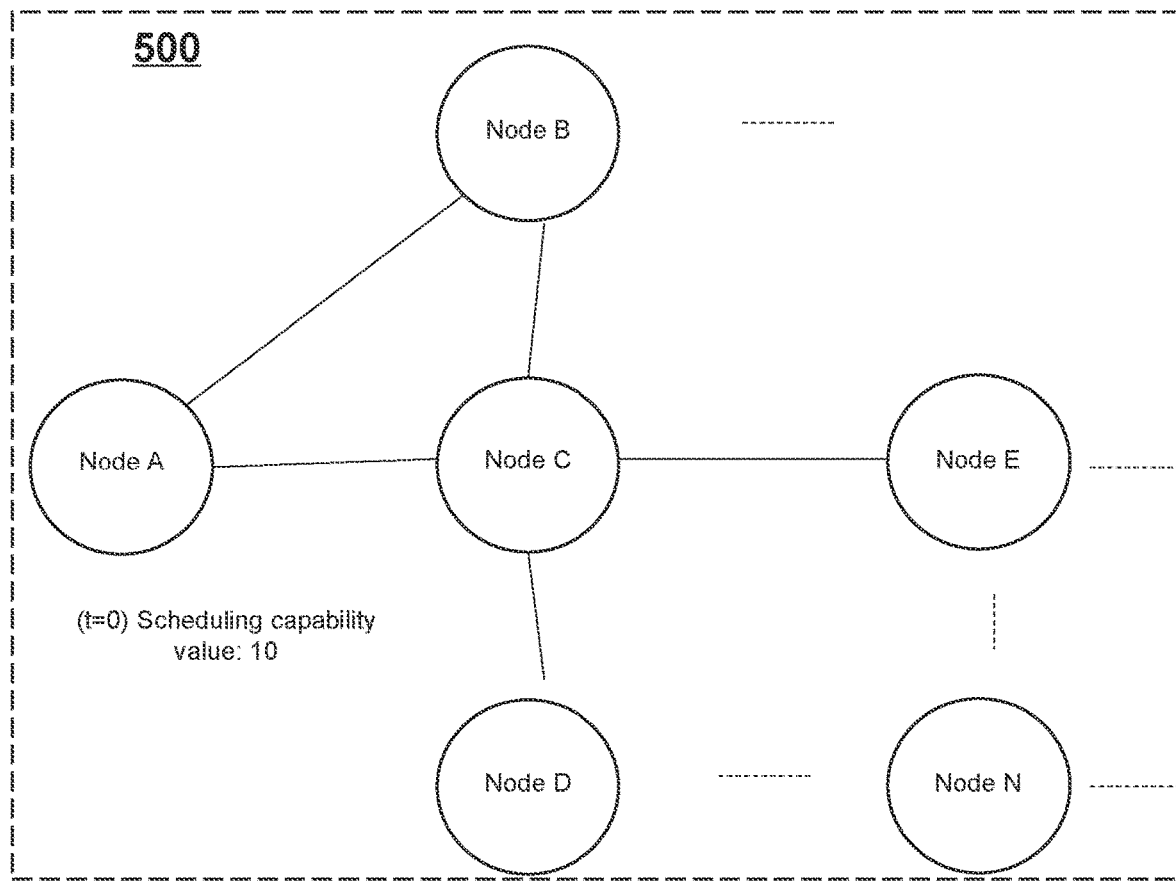
FIG. 5 is a schematic diagram illustrating performing multiple rounds of iterative update on the scheduling capability value based on an area map according to some embodiments of the present disclosure.

FIG. 5 is a schematic diagram illustrating performing multiple rounds of iterative update on the scheduling capability value based on an area map according to some embodiments of the present disclosure.

The area map may refer to a map constructed based on the relevant information of each area of the city. The area map may represent the relationship between the scheduling capabilities of the areas. In some embodiments, the smart gas safety management platform 130 may obtain the count of on-call maintenance personnel in each area of the city and the positional relationship between the various areas to construct an area map from the smart gas data center 132.

The area map may include multiple nodes and multiple edges. Among them, the node denotes each area, and nodes may be connected to form edges, which represent the relationship between two connected nodes.

As shown in FIG. 5, the area map 500 may include node A, node B, node C, node D, node E . . . and node N, respectively, representing preset area A, area B, area C, area D, area E . . . area N (other nodes not shown).

The features of the node may include the currently count of on-call maintenance personnel in the area. For example, the currently count of on-call maintenance personnel in area A is 10, and the feature of node A may include the count of on-call maintenance personnel n=10.

In some embodiments, the features of the node may further include a scheduling capability value, which represent the scheduling capability of the on-call maintenance personnel in the corresponding area. The scheduling capability value may be positively related to the currently count of on-call maintenance personnel in the area, as described below.

The edge of the area map may be generated based on the connection of nodes represented by any two areas that may be connected to each other. As shown in FIG. 5, the edge AC in the area map 500 may be generated by the connection of node A and node C, and the edge BC may be generated by the connection of node B and node C.

A feature of edge may include a distance between nodes. For example, if the distance between area A and area C is 5 km, the feature of the edge AC may include S=5 km. In some embodiments, the distance may be determined based on the length of the road that communicates between area A and area C. When there are multiple interconnecting roads, the distance may be determined based on the length of the shortest road.

In some embodiments, the edge feature may further include a weight value. The weight value may be related to the household features of the two nodes connected by the edge. More descriptions of the household features may be found in FIG. 3 and its related descriptions. The weight value of the edge is the value preset by the system.

The smart gas safety management platform 130 may analyze and process the area map 500 to determine the scheduling capability value of each node. In some embodiments, the smart gas safety management platform 130 may update the scheduling capability value of each node in the area map 500 through multiple rounds of iterative processing based on a preset algorithm. For each node of at least one node, the smart gas safety management platform 130 may determine the updated scheduling capability value of the node based on a scheduling capability value to be updated of the node, a scheduling capability value to be updated of each of other nodes directly connected to the node, and a value of an edge between the node and each of other nodes directly connected to the node. The following may describe the multi-round of update.

During the initialization operation, the scheduling capability value to-be-updated of each node may be the initial scheduling capability value. The initial scheduling capability value of each node may be obtained based on the following formula (1)

$$V(p_i; 0) = \frac{N_i}{\text{degree}(p_i)} \quad (1)$$

Among them, the $V(p_i; 0)$ denotes the scheduling capability value of the node i during the initialization operation. The $N_i$ denotes the count of on-call maintenance personnel for the node i. The degree($p_i$) denotes the degree of the node i, which may be determined based on the count of edges of a node connected to node i. As shown in FIG. 5, the nodes connected to node A may include node B and node C, and the edges are AC and Aft then the degree of node A is 2. The nodes connected to node C may include node A, node B, node D and node E, the edges are AC, BC, CD and CE, respectively, then the degree of node C is 4. Similarly, the degrees of nodes B, D, and E are 2, 1, and 1, respectively.

As shown in FIG. 5, the count of on-call maintenance personnel of node A, node B, node C, node D, and node E are 10, 8, 0, 5, and 6, respectively, and the degrees of nodes are 2, 2, 4, 1 and 1, respectively, and thus the initial scheduling capability value V is 5, 4, 0, 5, and 6, respectively, based on formula (1) during the initialization operation.

It can be understood that when the count of on-call maintenance personnel for a node i is $N_i=0$, the scheduling capability value of the node is 0.

In some embodiments, the smart gas safety management platform 130 may use the updated scheduling capability value of the node as a scheduling capability value to be updated of the node in a next iteration, and calculate based on the preset formula to update the to-be-updated scheduling capability value of each node.

Exemplarily, after the initial scheduling capability value of each node is determined in the initialization operation, in the first round and each subsequent round of iterations, that is, at time t+1, the scheduling capability value of node i to be updated may be calculated by the following formula (2):

$$V(p_i; t+1) = V(p_i; t) + d\Sigma_{p_j \in M(p_i)} \frac{\Delta V(p_j; t)}{w(p_i, p_j)} \quad (2)$$

Among them, in formula (2), the $V(p_i;t+1)$ denotes the scheduling capability value of node i at time t+1. When the count of on-call maintenance personnel of node i is 0, the $V(p_i; t+1)$ is 0, that is, a node with 0 on-call maintenance personnel always has no ability to schedule outwards.

The $V(p_i;t)$ in formula (2) denotes the scheduling capability value of node i after iteration at time t (the last round), and the d denotes a damping coefficient, which may be a preset value, for example, d=0.2.

The $M(p_i)$ denotes a set of nodes connected to node i, where the node $p_j$ denotes each node in the set $M(p_i)$. As shown in FIG. 5, for node C, the node $p_j$ includes node A, node B, node D, and node E, and the $M(p_i)$ denotes a node set formed by the above nodes.

The $\Delta V(p_j; t)$ in formula (2) denotes the change (difference value) between the updated scheduling capability value of each node $p_j$ after iteratively updated in the previous round (time t) and the scheduling capability value before the update. Exemplarily, it may be determined by the following formula (3):

$$\Delta V(p_j;t) = V(p_j;t) - V(p_j;t-1) \quad (3)$$

In formula (3), the change $\Delta V(p_j; t)$ of the scheduling capability value of node $p_j$ at time t is the difference between the scheduling capability value $V(p_j;t)$ after node $p_j$ is updated at time t and the scheduling capability value before the update at time t. It can be understood that the scheduling capability value before the update at time t is the scheduling capability value $V(p_j; t-1)$ after the update at time t−1. It should be noted that when the first round of iteration t=0, the variation is the initial scheduling capability value of the node determined by formula (1).

The $w(p_i, p_j)$ in formula (2) denotes a weight value, which may be determined based on the weight feature value of the edge connecting node i and node $p_i$. In some embodiments, the weight value may be determined by the following formula (4)

$$w(p_i, p_j) = \frac{k}{S} \quad (4)$$

Wherein, k in formula (4) may be a preset coefficient greater than 0, for example k=5 km. S denotes the distance between node i and node $p_i$, which may be determined based on the feature values of the edges in the area map 500. As shown in FIG. 5, the distance between node A and node C may be 5 km, and the feature of edge AC include S=5 km, so the weight value may be 5/5=1.

In the above formula (2), the weight value may also be determined based on other suitable ways. For example, the weight value may also be determined by introducing other preset factors other than distance. For example, the weight value may also be determined based on the household features of the two nodes (i.e., node i and node j) connected by an edge. The ways of determining the weight value are not limited herein.

In formula (2), the $$\Sigma_{p_j \in M(p_i)} \frac{\Delta V(p_j; t)}{w(p_i, p_j)}$$

denotes the sum of the ratios of the change values of the scheduling capability values to the weight values of all the nodes $p_j$ connected to the node $p_i$ at time t (i.e., the previous iteration). Based on the formula (2), the nodes in the area map 500 may be iteratively updated for multiple rounds, and the scheduling capability value of each node to be updated may be gradually updated.

In some embodiments, the smart gas safety management platform 130 may repeat the above formula (2) for multiple rounds of iterations to obtain the final scheduling capability value of each node, wherein the termination condition of the iterative update may be that the count of iterations reaches a preset count of thresholds.

In some embodiments, the termination condition of the iterative update may also be that the sum of the absolute values of the differences between the scheduling capability values of all nodes at two adjacent moments (two adjacent iterations) is less than a preset threshold. Exemplarily, the termination condition of the iteration may be determined based on the following formula (5):

$$\Sigma_{p_i \in G} |V(p_i; t+1) - V(p_i; t)| < \varepsilon \quad (5)$$

Among them, G denotes the set composed of all nodes, and $\varepsilon$ denotes the preset threshold.

In some embodiments, the smart gas safety management platform 130 may generate a scheduling policy based on the updated scheduling capability value of each node in the area map 500. For example, the scheduling policy may be determined based on the proportional relationship of the scheduling capability value of each node. More descriptions may be found in FIG. 4 and its related descriptions.

Some embodiments of the present disclosure are based on area maps, and the scheduling capacity value of each area may be determined by a predetermined algorithm, which may reflect the relationship of the scheduling capacity of each area more intuitively and effectively, and also improve the efficiency of obtaining the scheduling capacity value of each area, providing an effective basis for determining the scheduling policy of maintenance personnel.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been configured to describe embodiments of the present disclosure. For example, the terms "one embodiment," "an embodiment," and/or "some embodiments" mean that a particular feature, structure or feature described in connection with the embodiment is included in at least one embodiment of the present disclosure. Therefore, it is emphasized and should be appreciated that two or more references to "an embodiment," "one embodiment," or "an alternative embodiment" in various portions of the present disclosure are not necessarily all referring to the same embodiment. Furthermore, the particular features, structures or features may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties configured to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for management based on gas safety, wherein the method is implemented by a smart gas Internet of Things system for management based on gas safety, and the smart gas Internet of Things system includes a smart gas user platform configured as a terminal device, a smart gas service platform configured with a server for data transmission and communication, a smart gas safety management platform, a smart gas sensor network platform configured as a functional platform for managing sensor communication, and a smart gas object platform; the smart gas safety management platform includes a smart gas emergency maintenance management sub-platform and a smart gas data center, wherein the smart gas emergency maintenance management sub-platform is a platform for analyzing and processing data, and the smart gas data center is configured as a storage device; the smart gas object platform includes a smart gas device object sub-platform and a smart gas maintenance engineering object sub-platform; and the method is executed by at least one processor of the smart gas safety management platform, the method comprising:

obtaining, by the smart gas data center, gas-related features of at least one area from the smart gas object platform based on the smart sensor network platform, and sending the gas-related features to the the smart gas emergency maintenance management sub-platform; wherein the gas-related features include gas consumption features and household features, and the gas consumption features include a count of gas consumption failures; and the smart gas object platform is configured as various types of monitoring devices installed in the at least one area;

determining, by the smart gas emergency maintenance management sub-platform, alert vectors of the at least one area based on the gas-related features by manners for feature extraction, wherein the manners for feature extraction include convolutional neural networks, and the alert vectors including a leakage alert value;

determining, by the smart gas emergency maintenance management sub-platform, a count of on-call maintenance personnel in the at least one area based on the alert vectors;

determining, by the smart gas emergency maintenance management sub-platform, whether the count of on-call maintenance personnel meets a preset threshold; and in response to a determination that there is at least one area where the count of on-call maintenance personnel meets the preset threshold, performing, by the smart gas emergency maintenance management sub-platform, based on an area map, multiple rounds of iterative update on an initial scheduling capability value of each area of the at least one area that meets the preset threshold, the area map including one or more nodes and one or more edges, wherein the nodes correspond one-to-one with the areas of the at least one area; the nodes are connected to form the edges, and each of the edges represents a relationship between two connected nodes; wherein the initial scheduling capability value of each area of the at least one area is determined based on the count of on-call maintenance personnel for the area and a count of edges of other nodes connected to the node corresponding to the area; and determining, by the smart gas emergency maintenance management sub-platform, a real-time scheduling policy based on an updated scheduling capability value, wherein the real-time scheduling policy includes a scheduling quantity and a scheduling location when the on-call maintenance personnel is scheduled; and sending the real-time scheduling policy to the smart gas data center; and sending, by the smart gas data center, the real-time scheduling policy to the smart gas user platform through the smart gas service platform;

wherein each round of the multiple rounds of iterative update includes:

for each node of the one or more nodes, determining the updated scheduling capability value of the node based on a scheduling capability value to be updated of the node, a scheduling capability value to be updated of each of other nodes directly connected to the node, and a value of an edge between the node and the each of other nodes directly connected to the node; wherein an edge between two of the one or more nodes has a weight, and the weight of the edge is related to household features of the two nodes connected by the edge; and using the updated scheduling capability value of the node as a scheduling capability value to be updated of the node in a next round of iterative update;

when the updated scheduling capability value meets a preset condition, ending the update;

wherein in a first round of iterative update, the scheduling capability value to be updated of the node is the initial scheduling capability value of the area corresponding to the node.

2. The method of claim 1, wherein the first round of iterative update among the multiple rounds of iterative update includes: determining the initial scheduling capability value of the each node, and determining the initial scheduling capability value as the scheduling capability value to be updated of the node; and a tth round (t larger than 1) of iterative update among the multiple rounds of iterative update includes: using an updated scheduling capability value of the each node in the tth round as a scheduling capability value to be updated of the each node in a (t+1) th round, and updating the scheduling capability value to be updated of the each node based on a preset algorithm, wherein the updated scheduling capability value of the each node in the tth round is determined based on an updated scheduling capability value of the each node in a (t−1)th round, a change value between the updated scheduling capability value and a scheduling capability value to be updated of the each node in the (t−1)th round, and a feature of an edge connected the node.

3. The method of claim 1, wherein the gas-related features further include gas facility features, and the gas facility features include a type of a gas meter and a wear degree of a wiring.

4. The method of claim 3, wherein the wear degree of the wiring is related to a pressure during the gas delivery.

5. The method of claim 3, wherein the alert vectors further include a gas cut-off alert value; and the determining alert vectors for the at least one area based on the gas-related features by manners for feature extraction includes:

determining the gas cut-off alert value of the at least one area based on the gas facility features.

6. The method of claim 5, wherein the gas cut-off alert value is related to a count of gas consumption failures.

7. The method of claim 1, wherein features of the nodes include a currently count of on-call maintenance personnel in the at least one area, the scheduling capability value represents scheduling capability of the on-call maintenance personnel in the at least one area, and features of the edges include a distance and a weight value between two nodes connected by the edges, and the weight value is related to household features of the two nodes connected by the edges.

8. The method of claim 7, further comprising: determining the real-time scheduling policy based on a scheduling cost of the at least one area, the scheduling cost including the features of the edges.

9. A smart gas Internet of Things system for management based on gas safety, the smart gas Internet of Things system comprising: a smart gas user platform configured as a terminal device, a smart gas service platform configured with a server for data transmission and communication, a smart gas safety management platform, a smart gas sensor network platform configured as a functional platform for managing sensor communication, and a smart gas object platform; the smart gas object platform includes a smart gas device object sub-platform and a smart gas maintenance engineering object sub-platform; and the smart gas safety management platform including a smart gas emergency maintenance management sub-platform and a smart gas data center, wherein the smart gas emergency maintenance management sub-platform is a platform for analyzing and processing data, and the smart gas data center is configured as a storage device, wherein the smart gas data center is configured to obtain gas-related features of at least one area from the smart gas object platform based on the smart sensor network platform, and send the gas-related features to the the smart gas emergency maintenance management sub-platform; and the gas-related features including gas consumption features and household features, and the gas consumption features include a count of gas consumption failures; wherein the smart gas object platform is configured as various types of monitoring devices installed in the at least one area;

the smart gas emergency maintenance management sub-platform is configured to:

determine alert vectors of the at least one area based on the gas-related features by manners for feature extraction, wherein the manners for feature extraction include convolutional neural networks, and the alert vectors include a leakage alert value;

determine a count of on-call maintenance personnel in the at least one area based on the alert vectors;

determine whether the count of on-call maintenance personnel meets a preset threshold; and in response to a determination that there is at least one area where the count of on-call maintenance personnel meets the preset threshold, perform, based on an area map, multiple rounds of iterative update on an initial scheduling capability value of each area of the at least one area that meets the preset threshold, the area map including one or more nodes and one or more edges, wherein the nodes correspond one-to-one with the areas of the at least one area; the nodes are connected to form the edges, and each of the edges represents a relationship between two connected nodes; wherein the initial scheduling capability value of each area of the at least one area is determined based on the count of on-call maintenance personnel for the area and the count of edges of the other nodes connected to the node corresponding to the area; and determine a real-time scheduling policy based on the updated scheduling capability value, wherein the real-time scheduling policy includes a scheduling quantity and a scheduling location when on-call maintenance personnel is scheduled; and send the real-time scheduling policy to the smart gas data center; and the smart gas data center is further configured to send the real-time scheduling policy to the smart gas user platform through the smart gas service platform;

wherein each round of the multiple rounds of iterative update includes:

for each node of the one or more nodes, determining the updated scheduling capability value of the node based on a scheduling capability value to be updated of the node, a scheduling capability value to be updated of each of other nodes directly connected to the node, and a value of an edge between the node and the each of other nodes directly connected to the node; wherein an edge between two of the one or more nodes has a weight, and the weight of the edge is related to household features of the two nodes connected by the edge; and using the updated scheduling capability value of the node as a scheduling capability value to be updated of the node in a next round of iterative update;

when the updated scheduling capability value meets a preset condition, ending the update;

wherein in a first round of iterative update, the scheduling capability value to be updated of the node is the initial scheduling capability value of the area corresponding to the node.

10. The smart gas Internet of Things system of claim 9, wherein the first round of iterative update among the multiple rounds of iterative update includes: determining the initial scheduling capability value of the each node, and determining the initial scheduling capability value as the scheduling capability value to be updated of the node; and a tth round (t larger than 1) of iterative update among the multiple rounds of iterative update includes: using an updated scheduling capability value of the each node in the tth round as a scheduling capability value to be updated of the each node in a (t+1) th round, and updating the scheduling capability value to be updated of the each node based on a preset algorithm, wherein the updated scheduling capability value of the each node in the tth round is determined based on an updated scheduling capability value of the each node in a (t−1)th round, a change value between the updated scheduling capability value and a scheduling capability value to be updated of the each node in the (t−1)th round, and a feature of an edge connected the node.

11. The smart gas Internet of Things system of claim 9, wherein the gas-related features further include gas facility features, and the gas facility features include a type of a gas meter and a wear degree of a wiring.

12. The smart gas Internet of Things system of claim 11, wherein the wear degree of the wiring is related to a pressure during the gas delivery.

13. The smart gas Internet of Things system of claim 11, wherein the alert vectors further include a gas cut-off alert value, the smart gas safety management platform is configured to:

determine the gas cut-off alert value of the at least one area based on the gas facility features.

14. The smart gas Internet of Things system of claim 13, wherein the gas cut-off alert value is related to a count of gas consumption failures.

15. The smart gas Internet of Things system of claim 9, wherein features of the nodes include a currently count of on-call maintenance personnel in the at least one area, the scheduling capability value represents scheduling capability of the on-call maintenance personnel in the at least one area, and features of the edges include a distance and a weight value between two nodes connected by the edges, and the weight value is related to household features of the two nodes connected by the edges.

16. The smart gas Internet of Things system of claim 15, wherein the smart gas safety management platform is configured to:

determine the real-time scheduling policy based on a scheduling cost of the at least one area, the scheduling cost including the features of the edges.

17. A non-transitory computer-readable storage medium storing a set of instructions, when executed by at least one processor, causing the at least one processor to perform the method of claim 1.

\* \* \* \* \*